United States Patent [19]
Whitfield

[11] Patent Number: 6,119,494
[45] Date of Patent: Sep. 19, 2000

[54] LOCKING APPARATUS

[75] Inventor: Richard Guy Whitfield, Westwoodside, United Kingdom

[73] Assignee: Pegler Ltd., United Kingdom

[21] Appl. No.: 09/145,869

[22] Filed: Sep. 2, 1998

[30] Foreign Application Priority Data

Sep. 3, 1997 [GB] United Kingdom .................. 9718701

[51] Int. Cl.⁷ ................................................ F16K 35/10
[52] U.S. Cl. ............................ 70/177; 70/180; 70/203; 70/212; 137/385
[58] Field of Search ........................... 70/175–180, 202, 70/203, 211, 212; 137/385; 251/93

[56] References Cited

U.S. PATENT DOCUMENTS

| | | | |
|---|---|---|---|
| 1,040,040 | 10/1912 | Shephard | 70/180 |
| 1,683,649 | 9/1928 | Belote | 70/180 |
| 1,986,128 | 1/1935 | Trott | 70/177 |
| 4,208,893 | 6/1980 | Avrich et al. | 70/180 X |
| 4,534,379 | 8/1985 | Burge | 70/180 X |
| 4,848,724 | 7/1989 | Pettinaroli | 70/180 X |
| 5,003,797 | 4/1991 | Wirth et al. | 70/180 |
| 5,058,622 | 10/1991 | Chitty, Jr. et al. | 137/385 |
| 5,188,335 | 2/1993 | Pettinaroli | 70/180 X |
| 5,365,759 | 11/1994 | Bonomi | 70/180 X |
| 5,411,048 | 5/1995 | Massey | 70/180 X |
| 5,797,285 | 8/1998 | Sackowitz | 70/180 X |
| 5,806,555 | 9/1998 | Magno, Jr. | 70/180 X |
| 5,823,023 | 10/1998 | Benda | 70/180 |

FOREIGN PATENT DOCUMENTS

| | | | |
|---|---|---|---|
| 851923 | 1/1940 | France | 70/180 |

*Primary Examiner*—Lloyd A. Gall
*Attorney, Agent, or Firm*—Christensen O'Connor Johnson and Kindness PLLC

[57] ABSTRACT

A locking apparatus which is suitable for use with a manually operated control. The control is of a type which has a body and a handle. The handle is rotatable relative to the body and which is restricted to rotate between a first position defined by a first pair of abutment surfaces touching one another. In such a condition, a second pair of abutment surfaces are spaced apart to define a first gap between them. Rotation to a second limiting position is defined by the second pair of abutment surfaces touching one another and the first pair of abutment surfaces being spaced apart to define a second gap. The locking apparatus includes a first member which is attachable to the handle and a second member which is attached to the first member. The second member fits for use into either one of the first or second gap and provides further abutment surfaces each disposed to abut a respective adjacent abutment surface on the body of the control thereby to restrict rotation of the handle relative to the body.

15 Claims, 5 Drawing Sheets

LOCKING APPARATUS

BACKGROUND TO THE INVENTION

1. Field of the Invention

This invention relates to locking apparatus suitable for use with a manually operated control and more specifically, but not exclusively, with a handle operated control such as a valve.

One type of commonly-used control is a fluid flow valve which includes a rotatable lever handle which may be rotated between an open position to allow the flow of fluid through the valve and a closed position to shut off the flow of fluid.

One problem which may be encountered with the above type of valve arises because it is possible to move the handle from either position with relative ease. Thus there is always the potential that a handle may be set to the wrong position by accident, for example, by knocking the handle. The handle may also be set to the wrong position by a person acting maliciously.

It may, for example, be necessary to use the valve to shut off the flow of toxic fluid carried along a pipe line while maintenance work is performed. If, whilst this work was being performed, the valve were accidentally turned on thereby allowing the flow of toxic fluid to resume it could prove dangerous and possibly fatal to whoever was performing the maintenance work.

There may also be situations in which it is important that a valve be kept open for a certain amount of time, and in which it is highly undesirable that the valve be closed.

There are, indeed, many situations in which it is undesirable, if not essential, that valves are not accidentally or intentionally moved from the required position. It would therefore be useful to be able to prevent the valve handle being moved out of position.

2. Summary of the Prior Art

U.S. Pat. No. 5,003,797 discloses a locking device for a valve having a lever handle. The device includes a channel member defining a channel to receive a section of the lever handle when closed and a leg that bears against the valve or pipeline connected to it. A lock is inserted through the apertures in the channel member alongside an edge of the handle. However, this device is necessarily relatively large and may be cumbersome. Also, the above device can only be fitted on a valve the handle of which is in one specific position e.g. a closed position.

SUMMARY OF THE INVENTION

It is an aim of the present invention to provide an apparatus which would overcome or ameliorate some or all of the above identified problems by providing a locking apparatus which may be used with a manually operated control to restrict rotation of the handle when it is in one of a plurality of positions e.g. open or closed and which may be secured to the valve to prevent the valve being moved out of position.

It is also an aim of the present invention to provide an apparatus which is compact and which is inexpensive and easy to manufacture.

Accordingly, in a first aspect the present invention provides a locking apparatus suitable for use with a manually operated control, which control has a body and a handle which is rotatable relative to the body and which is restricted to rotate between a first position defined by a first pair of abutment surfaces touching one another and a second pair of abutment surfaces being spaced apart to define a first gap and a second position defined by the second pair of abutment surfaces touching one another and the first pair of abutment surfaces being spaced apart to define a second gap; the locking apparatus includes a first member which is attachable to the handle and a second member which is attached to the first member and which, is use, fits into either one of the first or second gap and provides further abutment surfaces each disposed to abut a respective adjacent abutment surface on the body of the control thereby to restrict rotation of the handle relative to the body.

This apparatus has the advantage that it can be used to restrict rotation of the handle when it is in one of two positions which may, for example, in embodiments where the control is a valve, correspond to an open or a closed condition of the valve. It also has the advantage that it can be embodied in many compact arrangements which may aid installation of the apparatus where space is limited.

Preferably, the first member and the second member are attached so that the locking device can be fitted to the control when the handle is in either the first or second position.

Advantageously, the apparatus is shaped so that, in use, it closely fits with the handle. This means that it is not easily knocked out of place.

It may be necessary to prevent a person who intends, for whatever reason, to move the handle from the desired position from doing so. With this problem in mind, the first member may provide at least one pair of apertures through which a part of a lock may be threaded to further secure the locking apparatus to the handle.

Most advantageously, the first member is attachable to the handle in such a way that, in use, it lies adjacent the portion of the handle to which it is attached. In a particularly preferred embodiment, the first member contacts the portion of the handle to which it is attached. Thus, the gap between the first member and the portion of the handle to which it is attached may be minimal. A minimal gap presents the advantage that a lever small enough to fit in such a small gap may not be strong enough to lever off the locking apparatus which locked in position on the handle. This may prevent or at least impede the removal of the locking apparatus from the handle once the handle is locked in position.

The control may include a controlling device mounted on a spindle, the spindle also being attached to an attachment portion of the handle by a fastener such as a nut. Removal of the handle might therefore allow a person access to and thereby control of the spindle and controlling device mounted thereon. With this in mind, the locking device may further include a shroud to cover at least a part of the fastener.

Preferably, the shroud is shaped and dimensioned to prevent access to the fastener by, for example, a tool designed for removing nuts.

Preferably the shroud member is disposed between the first member and the second member, thereby interconnecting these members.

In a preferred embodiment the shroud member is an open ended tubular formation. Alternatively, the shroud member may comprise a tubular formation which is closed at one end so that in use the shroud covers the fastener completely.

Preferably the first member is attachable to the handle by partially enclosing a portion thereof.

The first member may include a bridge member and preferably, this lies substantially parallel and near to a portion of the handle.

The handle may have an attachment portion which is attached, either directly or indirectly to a controlling device. Advantageously, the first member is attachable to a portion of the handle in close proximity to the attachment portion. This makes for a compact device which, when locked to the handle, is difficult to lever off the handle.

Preferably, the first member further includes two side wings, one depending from a respective side region of the bridge member and preferably these side wings each have a hole therethrough. A part of a locking device may be threaded through these holes to further secure the apparatus on to the handle. Advantageously these two apertures are aligned with one another to ease locking of the apparatus on to the handle.

Preferably, the second member has two opposing side surfaces which provide the further abutment surfaces. Conveniently, the second member is a panel which is shaped and dimensioned to fit in the first or second gap.

In embodiments which are in accordance with the last-preceding paragraph, the panel is curved so as to orient each further abutment surface in a favorable position to abut the respective adjacent abutment surface on the body of the control.

The locking apparatus may be fabricated from single sheet of material as this makes for efficient manufacturing of the apparatus.

While the invention may find particular use in fluid control valves the invention may also be used as a locking device for any manually operated control, which control has a body and a handle which is rotatable relative to the body and which is restricted to rotate between a first position defined by a first pair of abutment surfaces touching one another and a second pair of abutment surfaces being spaced apart to define a first gap and a second position defined by the second pair of abutment surfaces touching one another and the first pair of abutment surfaces being spaced apart to define a second gap; the locking apparatus includes a first member which is attachable to the handle and a second member which is attached to the first member and which, is use, fits into either one of the first or second gap and provides further abutment surfaces each disposed to abut a respective adjacent abutment surface on the body of the control thereby to restrict rotation of the handle relative to the body.

DETAILED DESCRIPTION OF THE PREFERRED EMBODIMENTS

Figure 1:
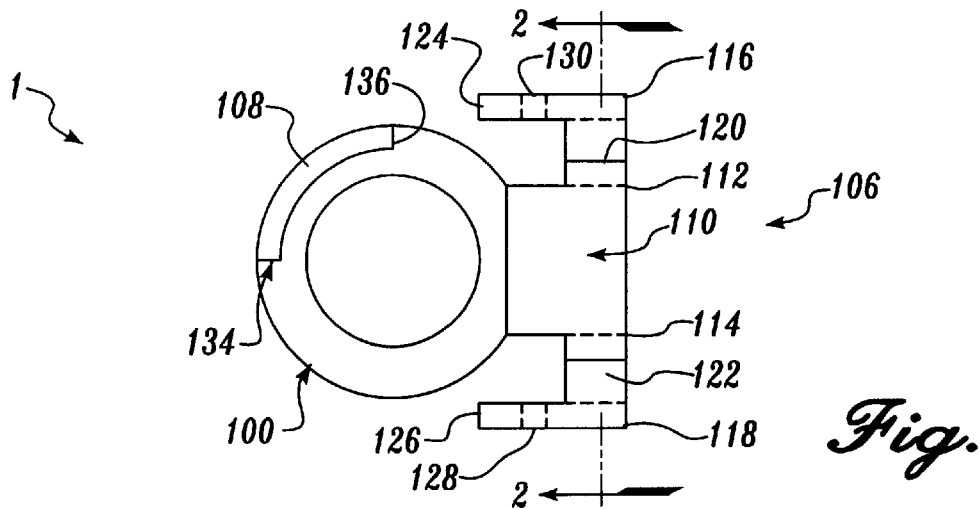
FIG. 1 is a plan view of a preferred embodiment of a locking apparatus according to the invention.
Figure 2:
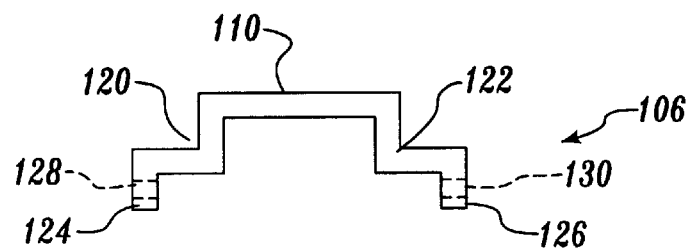
FIG. 2 is a cross section on line II to II of FIG. 1.
Figure 3:
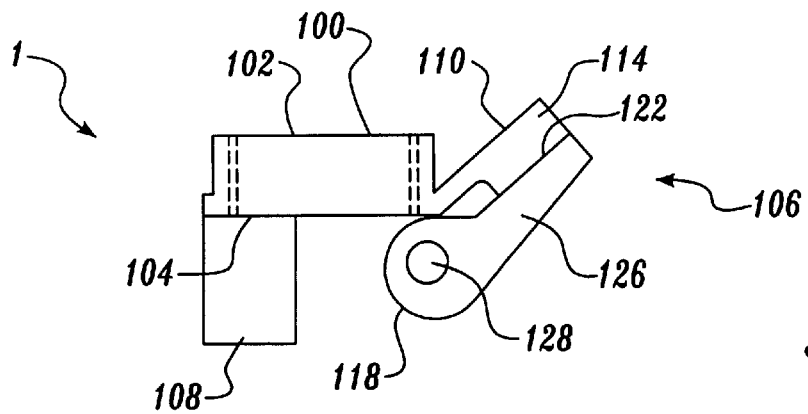
FIG. 3 is a side view of the locking apparatus of FIG. 1.
Figure 4:
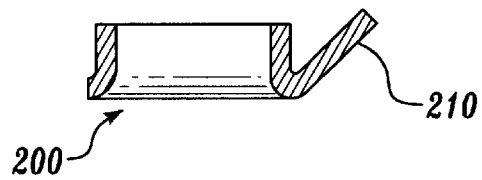
FIG. 4 is a cross section on line IV to IV of FIG. 5.

With reference first to FIGS. 1 to 3 there will now be described a locking apparatus being a first embodiment of the first aspect of the present invention.

The locking apparatus includes a shroud member 100 comprising an open ended tubular formation having upper 102 and lower 104 opposing open ends. The diameter of the shroud member 100 gradually increases along a section at the base, in the direction of the lower open end 104, as shown in FIG. 3.

The shroud 100 is disposed between a first member 106 and a second member 108, thereby attaching these two members together.

The first member 106 extends from the base of the shroud member 100 and comprises a bridge member 110 and two side wings 116 and 118, one disposed on each side of the bridge member 110. The side wings 116 and 118 each includes a respective L-shape d bracket 120 and 122 which depends from a respective side edge 112 and 114 of the bridge member 110. Depending from each L-shaped bracket 120 and 122 is a respective lobe 124 and 126 each having a smoothly curved lower perimeter and a respective aperture 128 and 130 therethrough. The apertures 128 and 130 are aligned with to one another.

FIG. 3 more clearly shows the construction of the L-shaped brackets 120 and 122 and their location relative to the bridge member 110.

The second member is a curved panel 108 which depends from the base of the shroud member 100.

The curved panel 108 has two opposing side portions 134 and 136.

Figure 5:
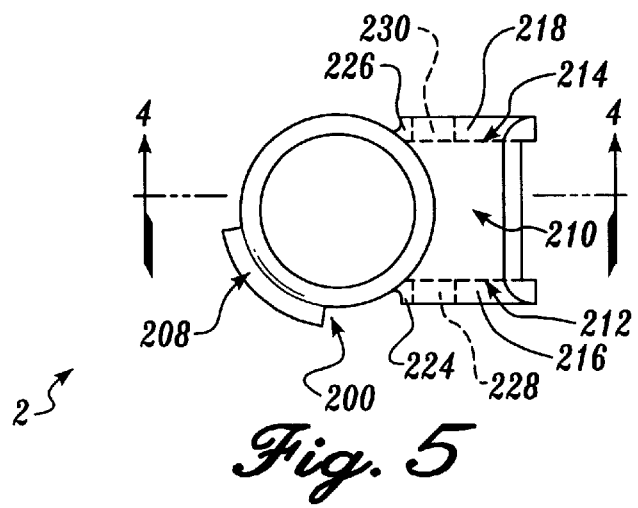
FIG. 5 is a plan view of the locking apparatus of FIG. 4.
Figure 6:
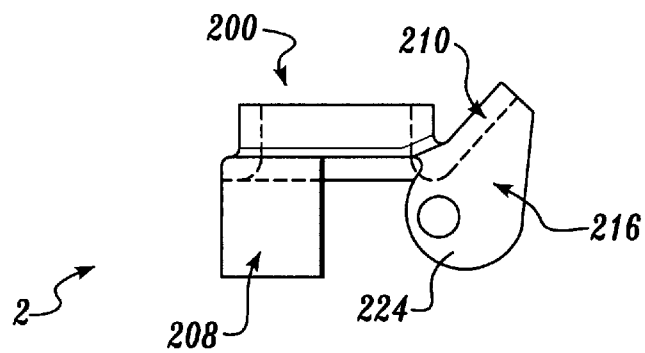
FIG. 6 is a side view of another embodiment of a locking apparatus according to the invention.

With reference to FIGS. 5 and 6 there will now be described a locking apparatus being a second embodiment of the first aspect of the invention.

In a second embodiment, the locking apparatus 2 has a shroud member 200, curved panel 208 and bridge member 210 which features are as in the first embodiment described above. However, in the second embodiment the side wings 216 and 218 are constructed so that respective lobes 224 and 226 depend directly from respective side edges 212 and 214 of the bridge member 210 and, in effect, there are no L-shaped bracket. Both embodiments of the locking apparatus 1 and 2 perform the job of locking the handle in position equally well. The differences between them reflect the possibility of using alternative methods of manufacture, the second embodiment being particularly suited for pressing from a flat metal blank.

Figure 7:
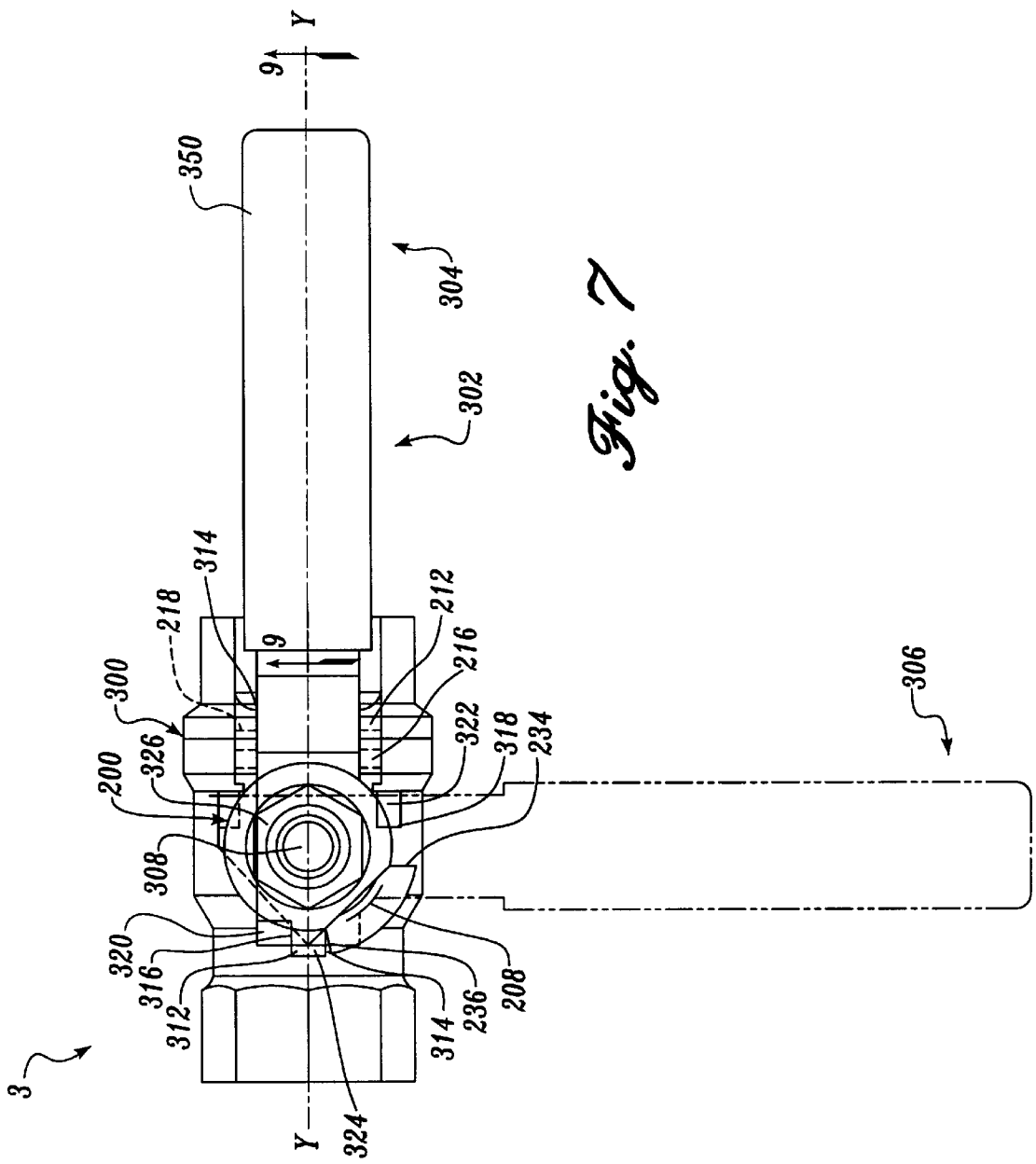
FIG. 7 is a plan view of the locking apparatus of FIGS. 5 and 6 fitted on a manually operated fluid flow control valve.
Figure 8:
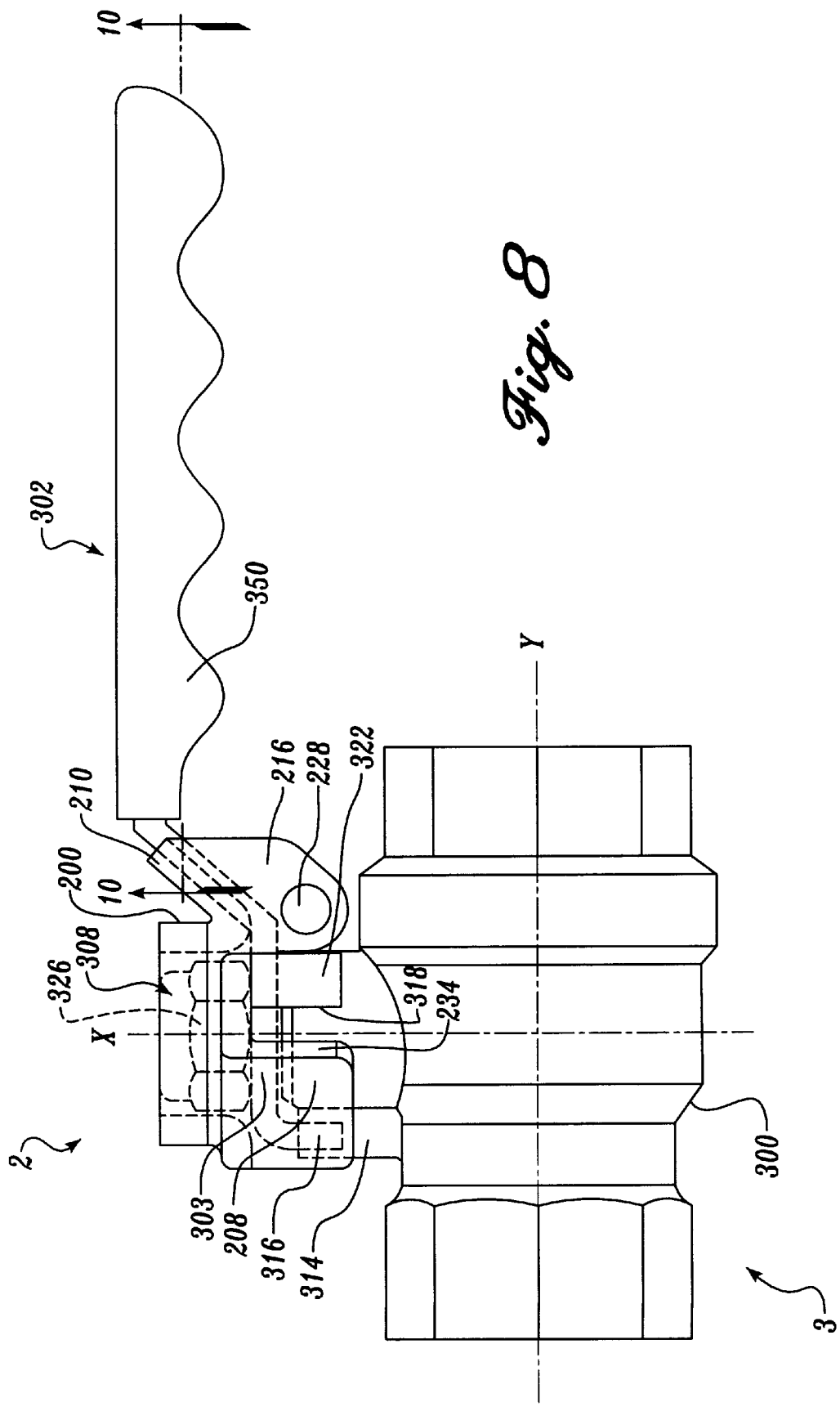
FIG. 8 is an enlarged side view of the locking apparatus and valve in FIG. 7.

With reference to FIGS. 7 and 8, there will now be described a handle operated valve fitted with a second embodiment of the invention.

The manually operated control exemplified in FIGS. 7 and 8 is a substantially conventional type of ball valve 3 used to control the flow of fluid. The valve 3 includes a body 300 and a lever handle 302 which is rotatable relative to the body 300 so as to effect control of the flow of fluid through the interior of the valve body 300 by a controlling device (not shown in FIGS. 7 or 8) housed therein.

The valve body 300 has an aperture (not shown in FIGS. 7 or 8) which receives and orients an elongate spindle. 308 so that its central longitudinal axis X is substantially normal to the longitudinal axis Y of the valve body 300. A first portion of the spindle 308 extends into the interior of the valve body 300 and has a controlling device mounted thereon. In this example, the controlling device is a modified sphere (not shown in FIGS. 7 or 8) which is substantially conventional and known to those in the field, and will therefore not be discussed further here. Furthermore, it will be readily apparent to those skilled in the art that various other control devices could be envisaged here, for example a butterfly valve or a gate valve.

The spindle 308 and attached controlling device are disposed to rotate together, relative to the valve body 300 about an axis corresponding with the central longitudinal axis X of the spindle 308.

A second portion of the spindle 308 is exposed on the exterior of the valve body 300 and has a threaded section (not shown in FIGS. 7 or 8). The handle 302 of the valve 3 has an attachment portion 303 with a hole (not shown in FIGS. 7 or 8) therein to receive the spindle 308. A nut 326 screwed on the threaded portion of the spindle acts as a fastener to secure the handle 302 to the spindle 308. Rotation of the handle 302 thereby effects rotation of the controlling device and the handle which is restricted to rotate between an open position 304 in which the controlling device allows the flow of liquid through the valve and a closed position 306 in which the controlling device obstructs the flow of fluid through the handle.

Restriction of the handle is, in this particular valve, effected in the following way: The first position 304 (corresponding to an open condition of the valve) is defined by a first pair of abutment surfaces (a first valve body abutment surface 312 and a first handle abutment surface 316) touching one another and a second pair of abutment surfaces (a second valve body abutment surface 314 and a second handle abutment surface 318) being spaced apart to define a first gap. The second position 306 (corresponding to a closed condition of the valve) is defined by the second pair of abutment surfaces (314 and 318) touching one another and the first pair of abutment surfaces (312 and 316) being spaced apart to define a second gap.

The valve 3 is constructed so that the first and second valve abutment surfaces 316 and 318 are provided on respective first and second legs 320 and 322 depending from two locations, 90° apart about the axis X, on the valve handle 302. The first and second valve body abutment surfaces 312 and 314 are provided on respective sides of a protruding stub 324 on the valve body. The handle is located relative to the valve body so that the valve body stub 324 lies between the two legs.

Those skilled in the art will realize that restriction of rotation of the handle may be effected by various other types of valve construction, for example, the opposite of the above arrangement, i.e. where the first and second valve abutment surfaces are provided on a single leg depending from the valve handle and the first and second valve body abutment surfaces are provided on respective first and second stubs at two locations, 90 degrees apart, on the valve body. The locking apparatus would also be suitable for use with this type of valve.

The locking device 2 is located on the valve 3 with the shroud member 200 located to partially enclose the nut 326. The shroud member 200 is shaped and dimensioned so as to prevent access to the nut 326, and more specifically to prevent access to any of the flat sides of the nut 326 by, for example, a nut removing tool.

The bridge member 210 is shaped and oriented so that when the locking apparatus 2 is in position on the handle 302, the bridge member 210 lies parallel and close to the handle 302. In use, the two side wings 216 and 218 lie either side of the handle, so that together, the bridge member 210 and the side wings partially enclose the handle. The distance between the side edges 212 and 214 of the bridge member is dimensioned according to the width of the handle, so that, in use, the two side wings 216 and 218 lie close to the handle.

The two apertures (only one labelled 228 is shown in FIG. 8) provided in respective lobes 224 and 226 of the side wings 216 and 218 allow the operator to lock the apparatus in position on the handle by inserting a part of a lock between the holes 228 and 230. The holes are aligned to ease this procedure.

Once locked in position, removal of the locking apparatus is further impeded by the close fitting of the locking apparatus to the handle achieved by the features described above. The close fitting of the locking apparatus to the handle means that it is difficult to remove the locking apparatus by levering it off.

The curved panel is dimensioned to fit into either the first or second gap between abutment surfaces when the handle is in either a first or second position. The opposing side portions 234 and 236 of the curved panel provide further abutment surfaces which are disposed to abut a respective adjacent abutment surface i.e. valve body abutment surface 312 in the open position and valve abutment surface 314 in the closed position, thereby restricting rotation of the handle relative to the body when it is in either position.

The curved panel 208 has roughly the same curvature as the circumference of the base of the shroud member 200 from which it extends. The curvature of the panel orients the abutment surfaces provided on its opposing side portions 234 and 236 so that, in use, they are in a favorable position to abut the respective adjacent abutment surface on the valve body.

Figure 9:
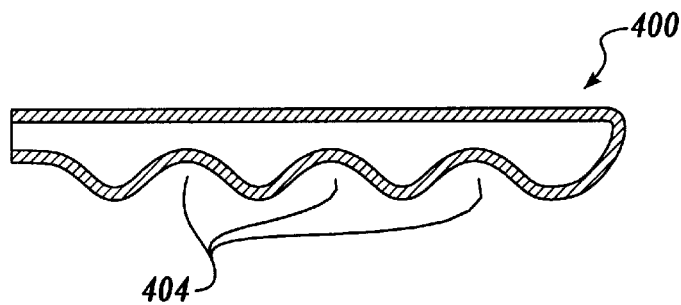
FIG. 9 is a cross section along line IX to IX of FIG. 7 simplified to show the shape of the sleeve only.
Figure 10:
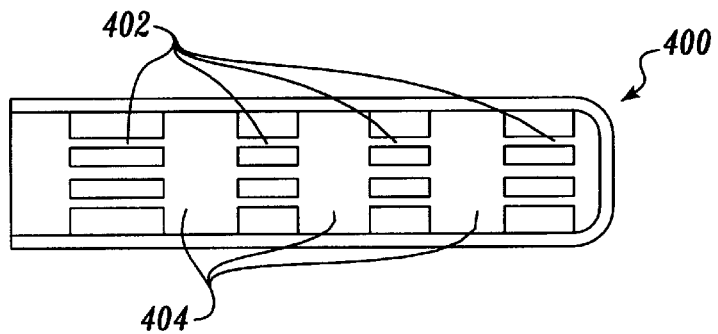
FIG. 10 is a cross section along line X to X of FIG. 8.

The handle 302 has a free end portion which is fitted with a gripping sleeve 350 fabricated from PVC, as is more clearly shown in FIGS. 9 and 10.

With reference to FIGS. 9 and 10 there will now be described a gripping sleeve. The gripping sleeve 400 fits tightly on and encloses the free end portion of the handle. The underside of this end portion is covered by the underside portion of the gripping sleeve which incorporates integral columns of support ribs 402 which are made from the same material. The support ribs 402 provide extra insulation which is useful for situations where the valve and therefore the handle becomes hot, for example, when the valve is fitted to a pipe carrying high temperature fluid. The ribs 402 also function to shape the underside portion of the gripping sleeve 400. Indentations formed at the gap between adjacent columns of support ribs 402 provide convenient positions for the user's fingers to be placed when holding the handle, making the handle easier to grip.

Figure 11:
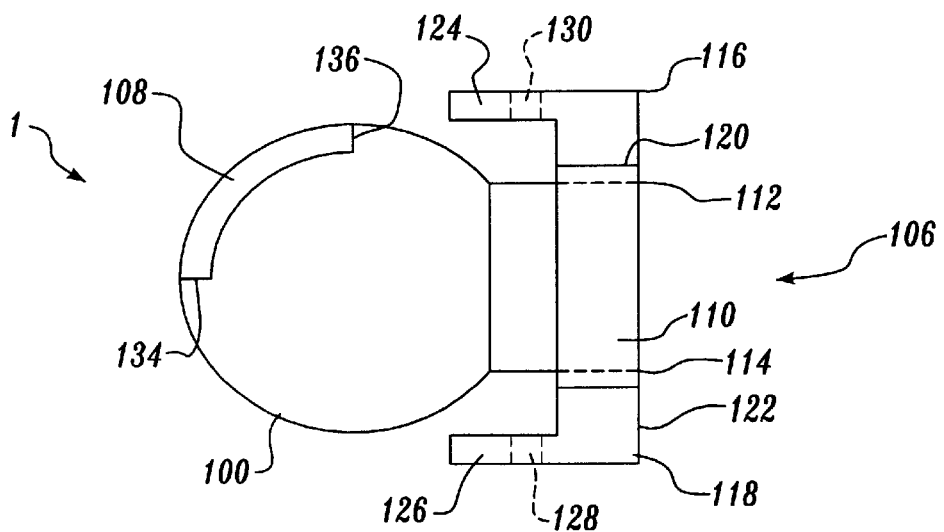
FIG. 11 is a plan view of an alternative embodiment to that shown in FIG. 1.

FIG. 11 shows an alternative locking apparatus corresponding to that illustrated in FIG. 1, with corresponding reference numerals in FIG. 11 indicating identical features to those of the FIG. 1 embodiment, but in which the shroud member 100 comprises a tubular formation closed at one end so that when in use, the shroud covers the fastener completely.

The above embodiments of the present invention have been described by way of example only and various alternative features or modifications from what has been specifically described and illustrated can be made within the scope of the invention, as defined by the claims, as will be readily apparent to persons skilled in the art.

What is claimed is:

1. A locking apparatus suitable for use with a manually operated control, which control has a body and a lever handle which is rotatable relative to the body and which is restricted to rotate between a first position defined by a first pair of abutment surfaces on the body and handle touching one another and a second position defined by a second pair of abutment surfaces on the body and handle touching one another, in the first position the second pair of abutment surfaces are spaced apart to define a first gap and in the second position the first pair of abutment surfaces are spaced apart to define a second gap; this locking apparatus including a first member which is configured to be attachable over the handle and a second member which is attached to the first member and which, in use, fits into either one of the first or second gap and provides further abutment surfaces each disposed to abut one of the abutment surface on the body of the control thereby to restrict rotation of the handle relative to the body, the first member providing at least one pair of apertures positionable below the handle to which a part of a lock may be threaded to further secure the locking apparatus to the lever handle.

2. A locking apparatus according to claim 1 in which the first member and the second member are attached so that the locking apparatus can be fitted to the control when the handle is in either the first or second position.

3. A locking apparatus according to claim 1 in which the apparatus is shaped so that, in use, it closely fits with the handle.

4. A locking apparatus according to claim 1 in which the first member is attachable to the handle in such a way that, in use, it lies adjacent to the portion of the handle to which it is attached.

5. A locking apparatus according to claim 4 in which the first member contacts the portion of the handle to which it is attached.

6. A locking apparatus according to claim 1 for use with a control which includes a controlling device mounted on a spindle, the spindle also being attached to an attachment portion of the handle by a fastener such as a nut, the locking apparatus further comprising a shroud to cover at least a part of the fastener.

7. A locking apparatus according to claim 6 in which the shroud is shaped and dimensioned to prevent access to the fastener by, for example, a tool designed for removing nuts.

8. A locking apparatus according to claim 6 in which the shroud is disposed between the first member and the second member, thereby interconnecting these members.

9. A locking apparatus according to claim 6 in which the shroud is an open-ended tubular formation.

10. A locking apparatus according to claim 6 in which the shroud comprises a tubular formation which is closed at one end so that in use the shroud covers the fastener completely.

11. A locking apparatus according to claim 1 in which the first member is attachable to the handle by partially enclosing a portion thereof.

12. A locking apparatus according to claim 1 in which the first member includes a bridge member which lies substantially parallel and near to a portion of the handle in use.

13. A locking apparatus according to claim 12 in which the first member further includes two side wings, one depending from a respective side region of the bridge member and these side wings each having a hole therethrough.

14. A locking apparatus according to claim 1 in which the second member has two opposing side surfaces which provide the further abutment surfaces, the second member being a panel which is shaped and dimensioned to fit in the first or second gap.

15. In combination, a manually operated control, which control has a body and a lever handle which is rotatable relative to the body and which is restricted to rotate between a first position defined by a first pair of abutment surfaces on the body and handle touching one another and a second pair of abutment surfaces on the body handle being spaced apart to define a first gap and a second position defined by the second pair of abutment surfaces touching one another and the first pair of abutment surfaces being spaced apart to define a second gap; and a locking apparatus which includes a first member which is configured to be attachable over the handle and a second member which is attached to the first member and which, use, fits into either one of the first or second gap and provides further abutment surfaces each disposed to abut one of the abutment surfaces on the body of the control thereby to restrict rotation of the handle relative to the body, the first member providing at least one pair of apertures positionable below the handle to which a part of a lock may be threaded to further secure the locking apparatus to the lever handle.

* * * * *

UNITED STATES PATENT AND TRADEMARK OFFICE
CERTIFICATE OF CORRECTION

PATENT NO. : 6,119,494  
DATED : September 19, 2000  
INVENTOR(S) : R.G. Whitfield Page 1 of 1

It is certified that error appears in the above-identified patent and that said Letters Patent is hereby corrected as shown below:

Title page,
Item [30], Foreign Application Priority Data "9718701" should read -- 9718701.7 --

Title page,
Item [56], References Cited (U.S. Patents) insert in appropriate numerical order the following: -- 4,498,320  2/1985  Mullis --

Column 7,
Line 8, "surface" should read -- surfaces --

Column 8,
Line 33, "which, use" should read --which, in use --

Signed and Sealed this

Sixteenth Day of October, 2001

*Attest:*

NICHOLAS P. GODICI
*Attesting Officer*   *Acting Director of the United States Patent and Trademark Office*